(12) United States Patent
Biancalana

(10) Patent No.: US 12,528,548 B2
(45) Date of Patent: Jan. 20, 2026

(54) VEHICLE WITH MOVABLE REAR AERODYNAMIC SURFACES

(71) Applicant: FERRARI S.P.A., Modena (IT)

(72) Inventor: Matteo Biancalana, Modena (IT)

(73) Assignee: FERRARI S.P.A., Modena (IT)

( * ) Notice: Subject to any disclaimer, the term of this patent is extended or adjusted under 35 U.S.C. 154(b) by 388 days.

(21) Appl. No.: 18/452,705

(22) Filed: Aug. 21, 2023

(65) Prior Publication Data

US 2024/0067275 A1    Feb. 29, 2024

(30) Foreign Application Priority Data

Aug. 25, 2022  (IT) .......................... 102022000017631

(51) Int. Cl.
*B62D 35/00*     (2006.01)
(52) U.S. Cl.
CPC .................................. *B62D 35/007* (2013.01)
(58) Field of Classification Search
CPC .............................. B62D 35/007; B62D 37/02
See application file for complete search history.

(56) References Cited

U.S. PATENT DOCUMENTS

| | | | |
|---|---|---|---|
| 4,867,499 A | 9/1989 | Stephan et al. | |
| 5,486,032 A | 1/1996 | Reed et al. | |
| 2006/0261637 A1* | 11/2006 | Garcia | B62D 35/007 |
| | | | 296/180.1 |
| 2017/0158258 A1* | 6/2017 | Fahland | B62D 35/005 |

FOREIGN PATENT DOCUMENTS

| | | | | |
|---|---|---|---|---|
| DE | 102008043470 A1 | * | 5/2010 | |
| DE | 102016122932 A1 | * | 6/2017 | ........... B62D 35/005 |
| FR | 2237462 A6 | | 2/1975 | |

OTHER PUBLICATIONS

Italian Search Report for Application No. 102022000017631, Filing Date: Aug. 25, 2022; Date of Mailing: Apr. 3, 2023, 8 pages.

* cited by examiner

*Primary Examiner* — Lori Lyjak
(74) *Attorney, Agent, or Firm* — CANTOR COLBURN LLP

(57) ABSTRACT

A vehicle has a roll axis, a pitch axis and a yaw axis and includes a tail portion and a beam fixed at the tail portion and extending according to the pitch axis, characterized by comprising at least two blades hinged to the beam around respective axes parallel to the pitch axis and defining respective faces, so that the blades are rotatable around the axes and selectively movable to a first configuration, in which the faces are arranged so as to be transversal, in use, to an aerodynamic flow of the vehicle along the roll axis, and to a second configuration, in which the faces are parallel to said aerodynamic flow and face one another.

6 Claims, 5 Drawing Sheets

VEHICLE WITH MOVABLE REAR AERODYNAMIC SURFACES

CROSS-REFERENCE TO RELATED APPLICATIONS

This patent application claims priority from Italian patent application no. 102022000017631 filed on Aug. 25, 2022, the entire disclosure of which is incorporated herein by reference.

TECHNICAL FIELD

The invention relates to a vehicle, in particular of sports type.

PRIOR ART

Some vehicles are known for including movable surfaces in the rear portion for an active adjustment of the downforce during use.

Actually, the need is felt in general to determine vehicle solutions increasingly versatile for developing vertical downforce loads.

More in particular, the need is felt to provide vehicles with a versatile configurability with at least a more unloaded configuration, in which the downforce and the aerodynamic drag are relatively low, and a more loaded configuration, in which the downforce is relatively high, possibly to the detriment of a greater aerodynamic drag.

Additionally, the need is also felt to decrease the stresses transmitted to the actuators destined to the adjustment of the position of the movable surfaces during the movement thereof by means of the actuators.

An object of the invention is to satisfy at least one of the above-described needs, preferably in a simple and repeatable manner.

DESCRIPTION OF THE INVENTION

According to the invention, the object is achieved by a vehicle as defined by claim 1.

The dependent claims describe particular embodiments of the invention.

BRIEF DESCRIPTION OF THE DRAWINGS

In the following, an embodiment of the invention is described in order to better understand the same, by way of non-limiting example and with reference to the accompanying drawings, wherein.

EMBODIMENTS OF THE INVENTION

Figure 1:
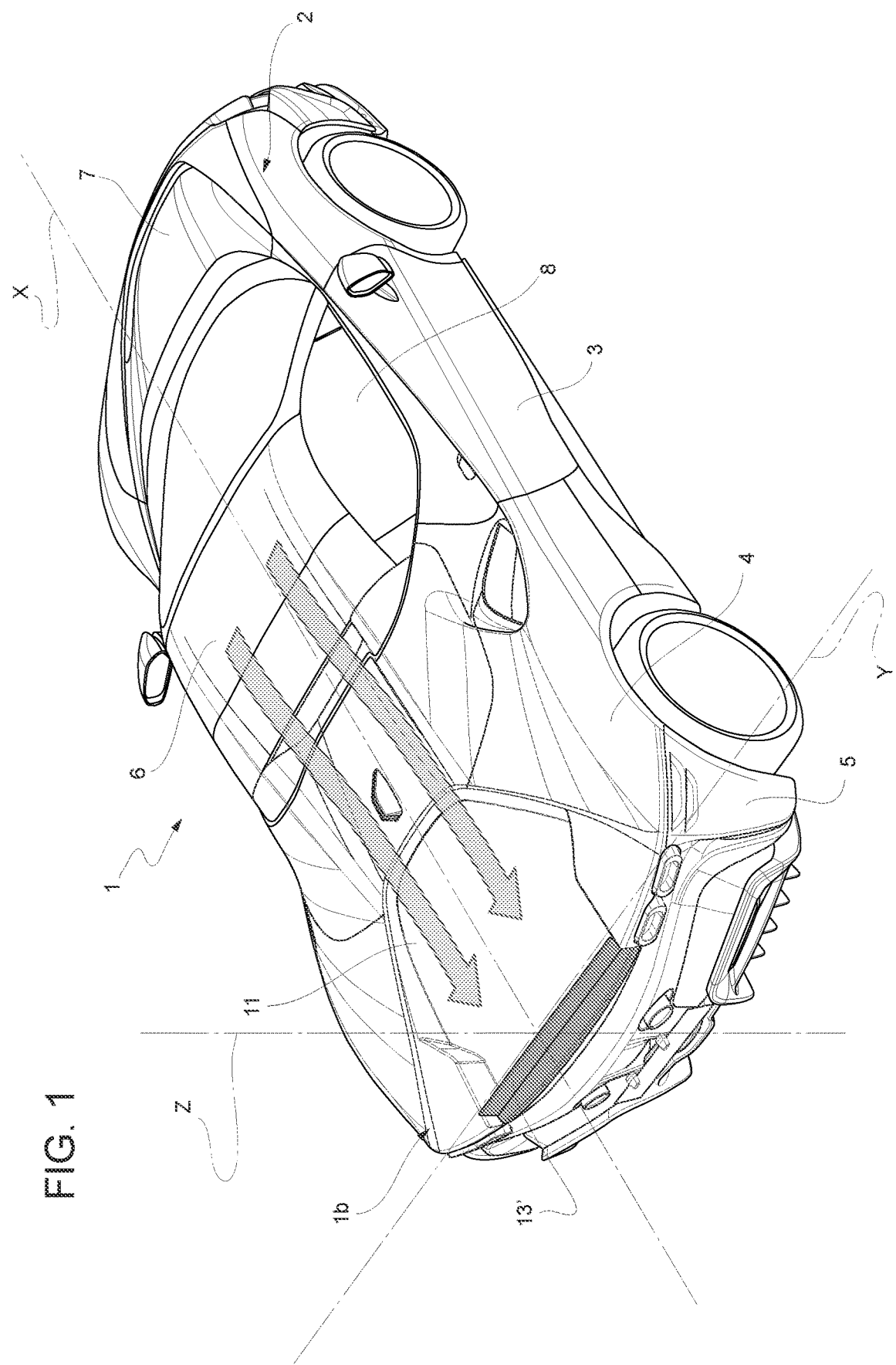
FIG. 1 is a perspective view of a vehicle according to the invention.
Figure 2:
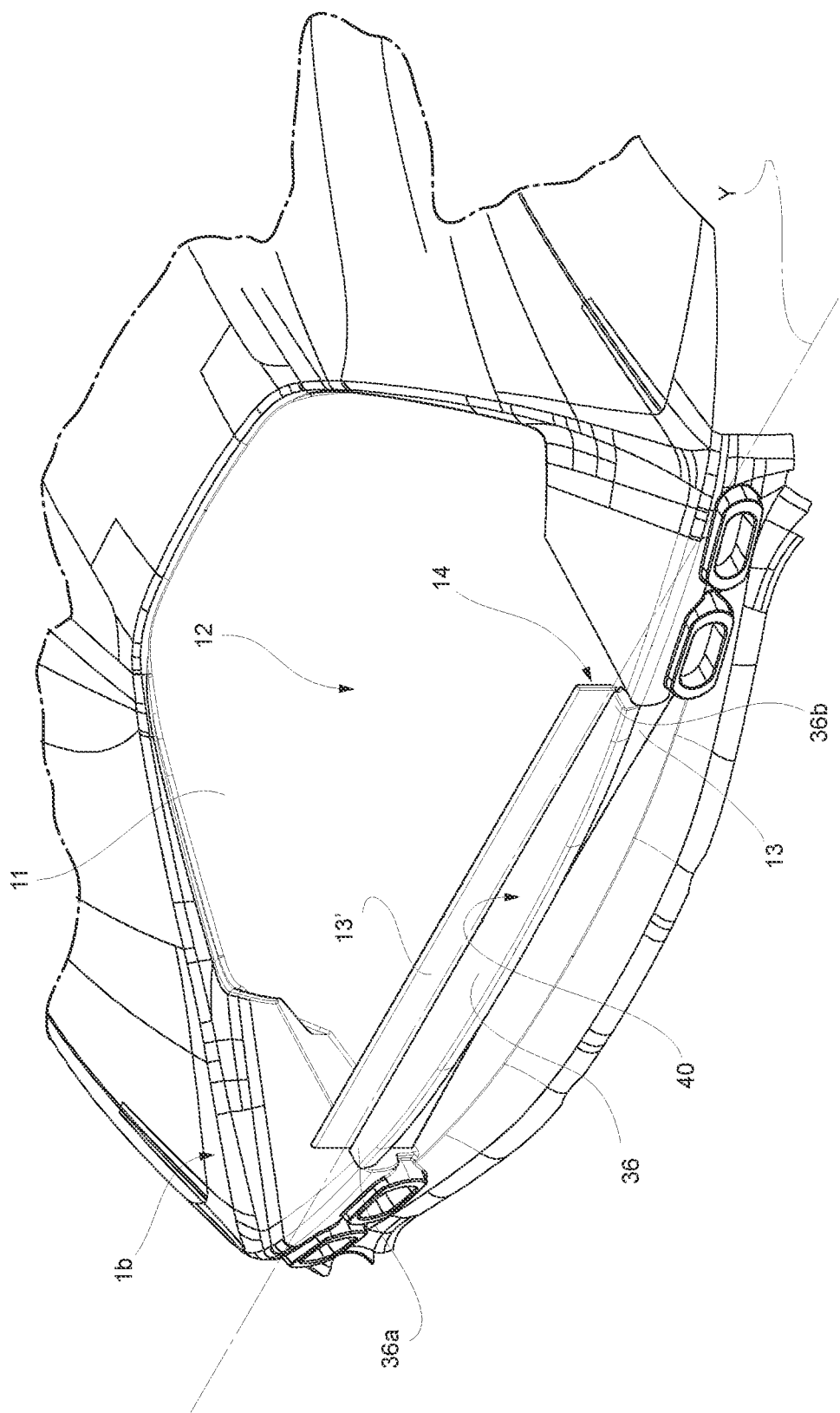
FIG. 2 is a perspective view, on an enlarged scale, of a rear portion of the vehicle.
Figure 3:
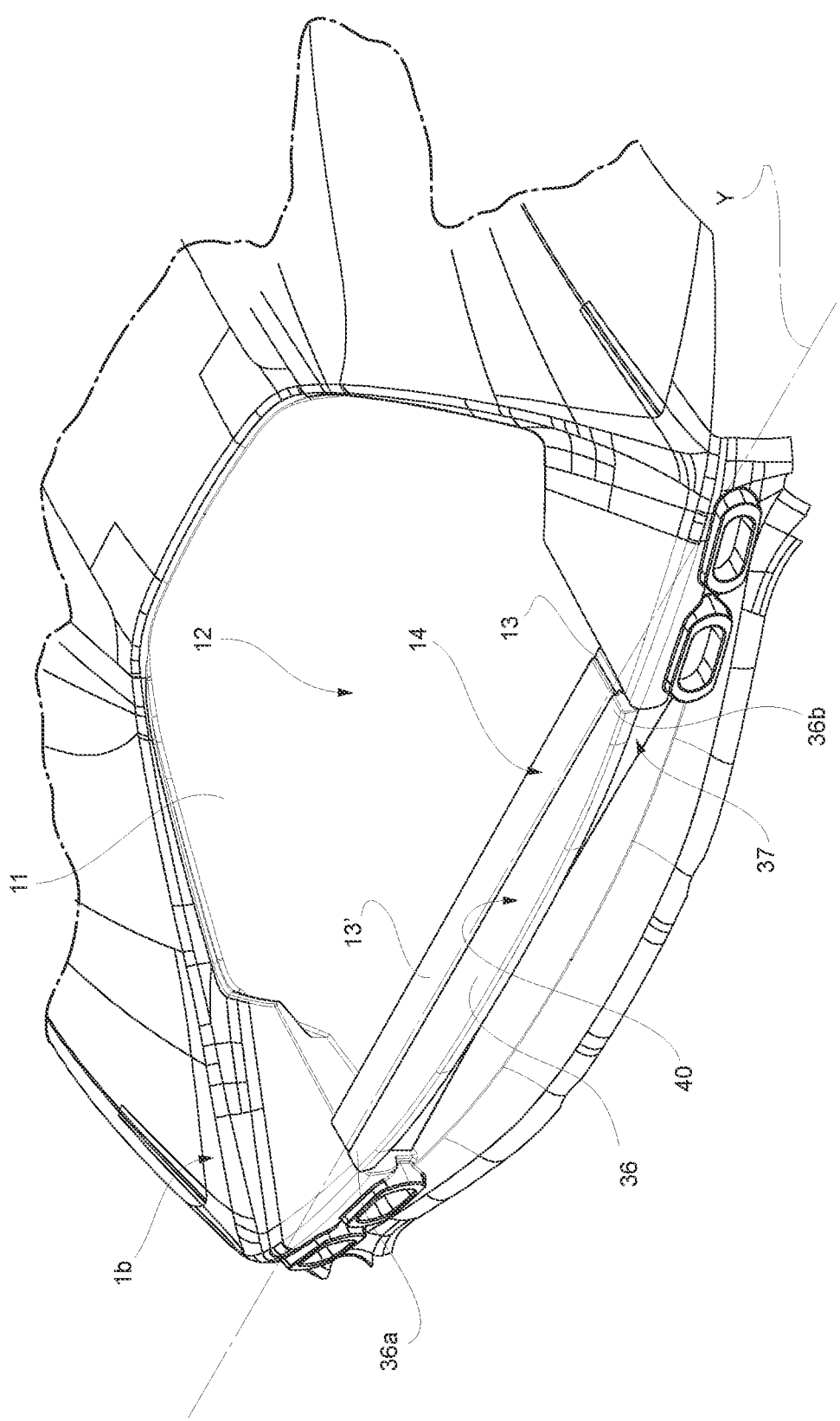
FIG. 3 is similar to FIG. 2 and shows the rear portion in a different configuration with respect to FIG. 2.
Figure 4:
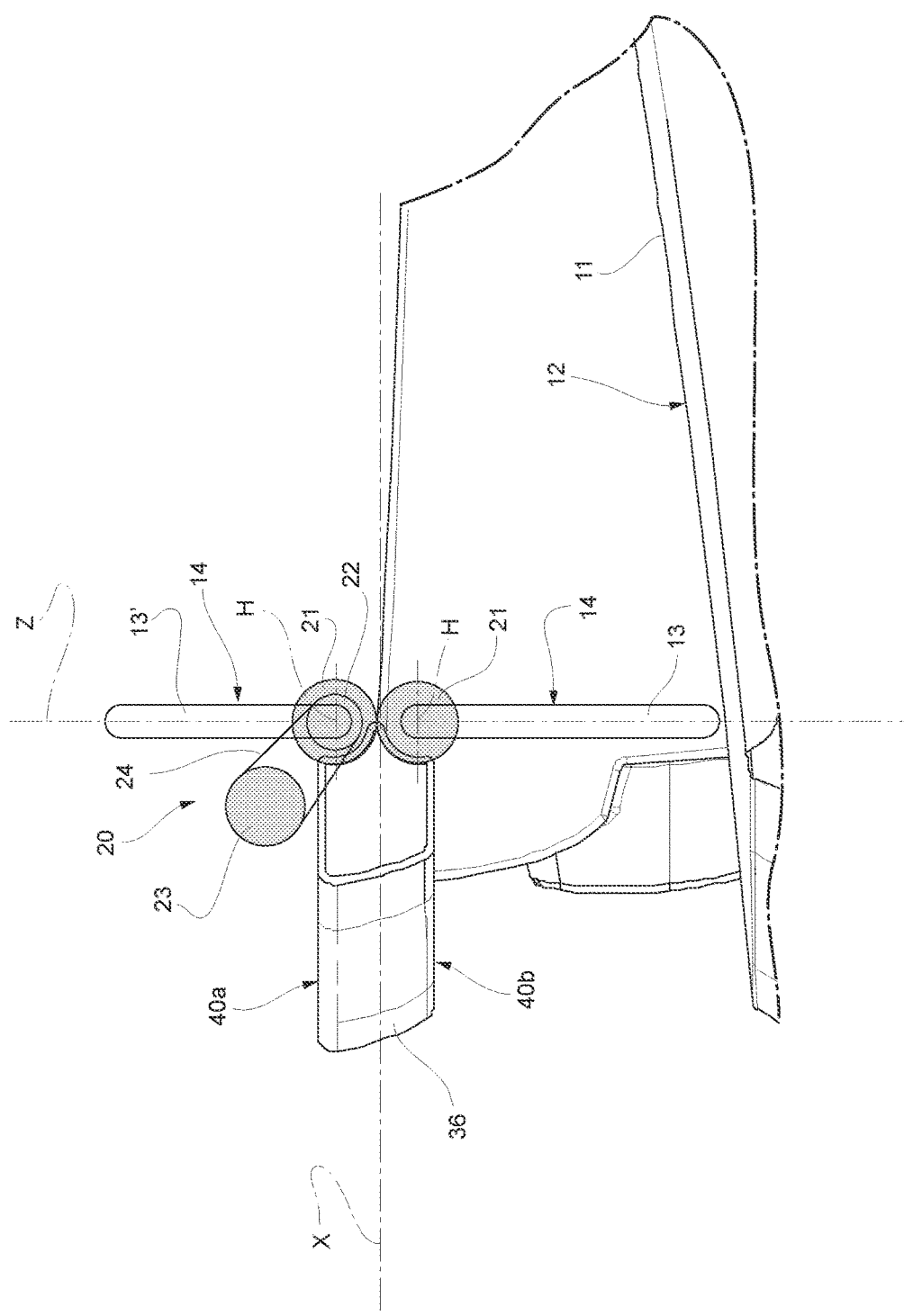
FIGS. 4 and 5 are side views of the rear portion, with parts removed for clarity, corresponding to the configurations of FIGS. 2, 3, respectively.
Figure 5:
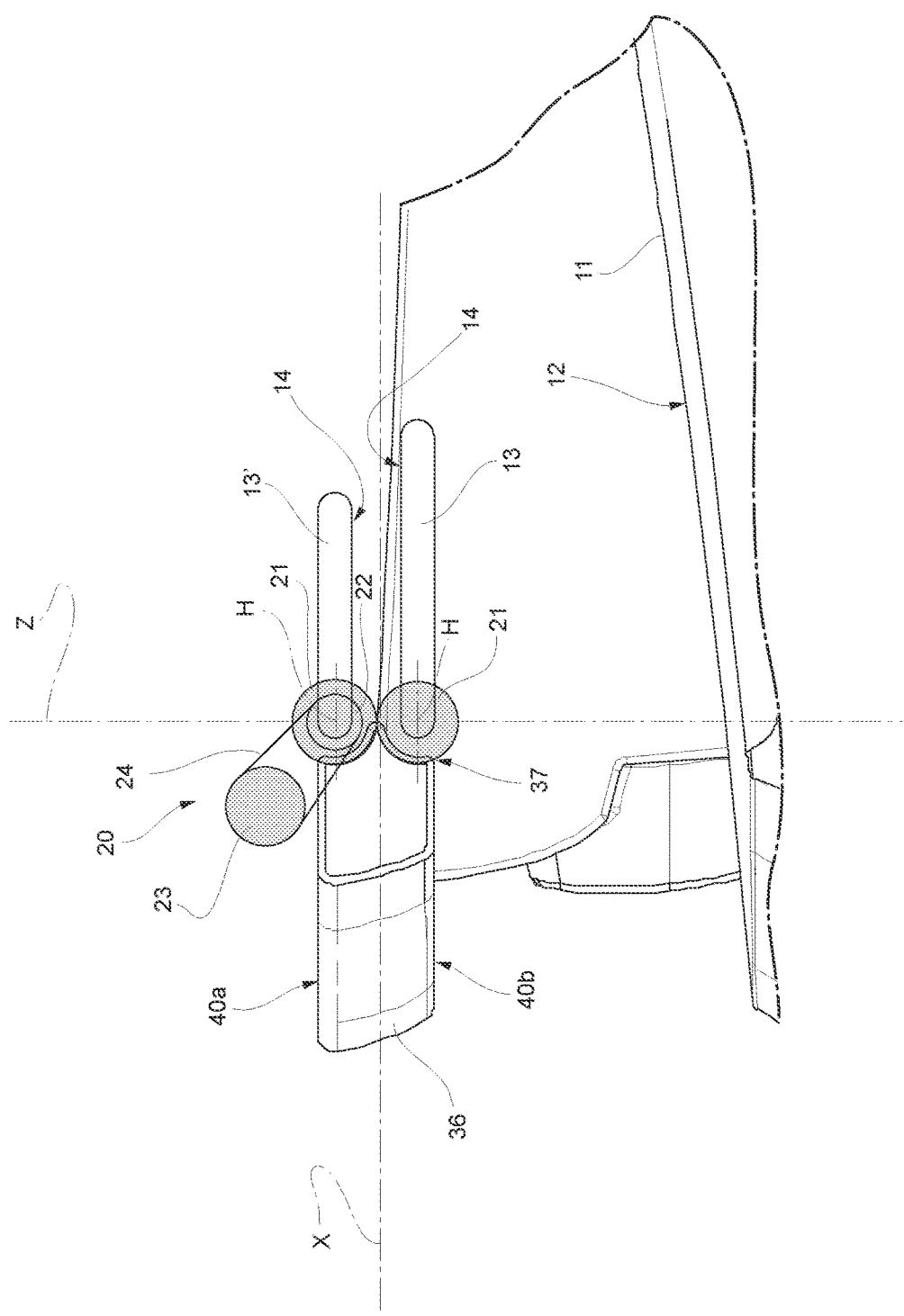

In FIG. 1, reference numeral 1 is used for indicating, as a whole, a vehicle.

As all vehicles, the vehicle 1 has a normal forward direction.

The forward direction coincides, as is known, with the roll axis X shown in FIG. 1. Furthermore, the vehicle 1 has a pitch axis Y, i.e. an axis which is horizontal and orthogonal to the axis X, as well as a yaw axis Z which is orthogonal to both axes X, Y.

The axis Z has at least one vertical component and is vertical when the axis X is horizontal, i.e. when the vehicle 1 advances in plane.

In the following, terms such as front and rear are to be understood with reference to the forward direction.

The vehicle 1 comprises a tail portion or rear portion 1b ending with a rear end of the vehicle 1.

The vehicle 1 further comprises a bodywork including, in turn, a frame not illustrated and a body 2 supported by the frame. The latter, in turn, includes a plurality of external panels of the vehicle, such as for example a door 3, a fender 4, a rear bumper 5, a roof 6, a hood 7, and the like.

The rear bumper 5 is part of the tail portion 1b.

The vehicle 1 further comprises other external panels of known type, such as a side window 8 and a windshield 9.

In general, the panels are external because each one has at least one external or outer surface of the vehicle 1, i.e. a surface visible by a user from the outside of the vehicle 1.

Among the panels, the vehicle 1 comprises an upper back panel 11 fixed at the tail portion 1b and arranged in particular between the roof 6 and the rear end of the vehicle 1.

The panel 11 faces upwards and specifically towards the back of the vehicle 1; therefore, the panel 11 is inclined downwards with respect to the roof 6.

In other words, the panel 11 has an outer surface 12 facing upwards and towards the outside of the vehicle 1.

Furthermore, the vehicle 1 comprises a beam 36 fixed at the tail portion 1b and extending according to the axis Y.

In particular, the beam 36 is arranged above the panel 11, more precisely above a rear portion 15 of the panel 11.

The beam 36 has two ends 36a, 36b which are opposite according to the axis Y and fixed to the tail portion 1b.

The vehicle 1 specifically has an opening 37 between the beam 36 and the panel 11 according to the axis Z. The opening 37 faces according to the axis X.

The beam 36 extends for the entire width of the portion 15 according to the axis Y, hence it covers the portion 15 from above, specifically in its entirety.

Furthermore, the vehicle 1 comprises two aerodynamic fins or blades 13, 13' hinged to the beam 36 around respective axes H parallel to the axis Y. The illustrated embodiment has only two blades 13, 13', but this is not essential. The vehicle 1, in fact, could comprise other blades. For example, the blades 13, 13' could also be divided into four or more blades, in particular assuming one or more cuts of the blades 13, 13' with one or more planes orthogonal to the axis Y, for example a middle plane of the vehicle 1 for obtaining four blades. The separation space between the four divided blades could be occupied and thus closed by a further blade fixed to the panel 11 so as to protrude transversally from the latter up to closing such separation space. This would apply in a similar manner also in the case of a higher number of divisions into more than four blades.

Preferably, the blades 13, 13' are identical to each other, in particular as for shape and size.

The blades 13, 13' define respective faces 14, in particular flat.

The blades 13, 13' are arranged one above the other according to the axis Z.

The blades 13, 13' are rotatable around the axes H and selectively movable to two distinct configurations.

According to a first configuration, i.e. a high downforce configuration, the blades 13, 13' or the faces 14 are arranged so as to be transversal to the aerodynamic flow which develops during the use of the vehicle 1 along the axis X.

Specifically, the blades 13, 13' or the faces 14 in the high downforce configuration are transversal or more precisely orthogonal to the axis X.

Each one of the blades 13, 13' in the high downforce configuration forms an obstacle for the air flow, which passes over the blade 13', i.e. the one arranged higher, forming vortexes on the opposite side of the blades 13, 13' with respect to that in which the flow meets the blades 13, 13'. In fact, a local depression develops at such opposite part due to the passing over of the blade 13' by the air flow. In this manner, a downforce load is generated acting on the vehicle 1.

On the other hand, the blades 13, 13' here determine an increase in the aerodynamic drag due to the interference with the air flow.

According to a second configuration, i.e. a low aerodynamic drag configuration, the blades 13, 13' or the faces 14 are arranged so as to be aligned with or parallel to the aerodynamic flow along the axis X.

Furthermore, the faces 14 face one another.

Specifically, the blades 13, 13' in the low aerodynamic drag configuration are aligned with or more precisely parallel to the axis X. In other words, the faces 14 are aligned with or more precisely parallel to the axis X. Still in other words, the faces 14 are transversal or more precisely orthogonal to the axis Z.

Here, the blades 13, 13' interfere in a minimum manner on the air flow, so that the aerodynamic drag is minimum.

Preferably, the beam 36 has two faces 40a, 40b, specifically opposite to one another according to the axis Z, with respect to which they are transversal. The faces 40a, 40b are arranged flush with the faces 14 when the blades 13, 13' are in the low aerodynamic drag configuration.

Preferably, in the high downforce configuration, the blade 13 has an end 13a, in particular radially opposite to an end 13b hinged to the beam 36. The end 13a is adjacent to the surface 12 in the high downforce configuration.

In this manner, the blade 13 and the surface 12 form a blind or wedge-shaped zone for interfering with the air flow, thus significantly limiting or even substantially preventing the passage of air between the blade 13 and the surface 12, thus generating the downforce load on the vehicle 1. In practice, the relative arrangement of the blade 13 and of the surface 12 substantially prevents the passage of the air along the axis X, without a passing over of the blade 13'.

In other words, in the high downforce configuration, the blade 13 closes the opening 37.

In the high downforce configuration, the faces 14 are preferably parallel and more preferably belonging to a same plane.

Furthermore, in the high downforce configuration, the blade 13 completely covers from above the rear portion 15 of the surface 12.

The surface 12 has a width size at the portion 15; the width size extends along the axis Y.

In the high downforce configuration, the entire width size is covered from above, in particular by the blade 13.

Conveniently, the vehicle 1 comprises an actuation device 20 controllable for moving the blades 13 in a coordinated manner between the high downforce configuration and the low aerodynamic drag configuration.

In particular, the actuation device 20 comprises two gear wheels 21 meshing with each another and respectively fixed with respect to the blades 13, 13', a driven pulley 22 which is fixed with respect to one of the blades 13, 13', specifically the blade 13', a motorized pulley 23, and a belt 24 for transmitting the rotation of the motorized pulley 23 to the driven pulley 22 and consequently to the two gear wheels 21 meshing with each another.

The rotation of the gear wheels 21 implies the coordinated rotation of the blades 13, 13' according to opposite rotation directions.

More in general, the actuation device 20 is configured to make the blades 13, 13' rotate in a coordinated manner according to opposite rotation directions. In particular, the actuation device 20 makes the blades 13, 13' rotate at the same speeds.

The actuation device 20 can be suitably controlled for example by means of a control unit not illustrated and optionally by means of a command not illustrated which can be actuated by a user of the vehicle 1 for controlling the control unit, so that the latter controls, in turn, the actuation device 20 in a corresponding manner.

Based on the foregoing, the advantages of the vehicle 1 are evident.

The vehicle 1 is strongly versatile since it has an attitude adjustable by means of the blades 13, 13' between at least two distinct configurations which respectively guarantee high downforce and low aerodynamic drag.

Furthermore, the rotation of the blades 13, 13' from the low aerodynamic drag configuration to the high downforce configuration does not seriously stress the actuation device 20. In fact, the air flow generated between the faces 14 facing one another in the low aerodynamic drag configuration actually favours the rotation of the blades 13, 13' towards the high downforce configuration.

Finally, it is clear that modifications and variations can be made to the vehicle 1 according to the invention without thereby departing from the scope of protection defined by the claims.

In particular, the number and the shape of the described and illustrated components could be different and in particular varied with great freedom.

Furthermore, the fact that the vehicle 1 comprises an upper back body panel 11 fixed at the tail portion 1b and having an outer surface 12 facing upwards and towards the outside of the vehicle, in which a first blade (13) of the two blades 13, 13' in the first configuration has an end 13a adjacent to the outer surface 12, could also be a preferred aspect but not strictly necessary, in particular combinable with any one of the aspects or embodiments described.

The invention claimed is:

1. A vehicle (1) having a roll axis (X), a pitch axis (Y) and a yaw axis (Z) and comprising a tail portion (1b) and a beam (36) fixed at the tail portion (1b) and extending according to the pitch axis (Y), the vehicle (1) further comprising at least two blades (13, 13') hinged to the beam (36) around respective axes (H) parallel to the pitch axis (Y) and defining respective faces (14), so that the blades (13, 13') are rotatable around the axes (H) and selectively movable to a first configuration, in which the faces (14) are arranged so as to be transversal, in use, to an aerodynamic flow of the vehicle (1) along the roll axis (X), and to a second configuration, in which the faces (14) are parallel to said aerodynamic flow and face one another, characterized by comprising an upper back body panel (11) fixed at the tail portion (1b) and having an outer surface (12) facing upwards and towards the outside of the vehicle, wherein a first blade (13) of the two blades (13, 13'), in the first configuration, has an end adjacent to the outer surface (12).

2. The vehicle according to claim 1, wherein the faces (14) are transversal to the roll axis (X) and to the yaw axis (Z) in the first and in the second configuration, respectively.

3. The vehicle according to claim 1, wherein the beam (36) comprises two further faces (40*a*, 40*b*) arranged flush with the faces (14) of the blades (13, 13') in the second configuration.

4. The vehicle according to claim 1, wherein the blades (13, 13') are arranged one above the other according to the yaw axis (Z).

5. The vehicle according to claim 1, having an opening (37) defined between the beam (36) and the upper back body panel (11) according to the yaw axis (Z), wherein the first blade (13) closes the opening (37) in the first configuration.

6. The vehicle according to claim 5, wherein the outer surface (12) has a width size at a rear portion of the upper back body panel (11) and extending according to the pitch axis (Y), the first blade (13) being arranged in the first configuration, so that the entire width size is completely covered from above.

\* \* \* \* \*